United States Patent Office 3,625,657
Patented Dec. 7, 1971

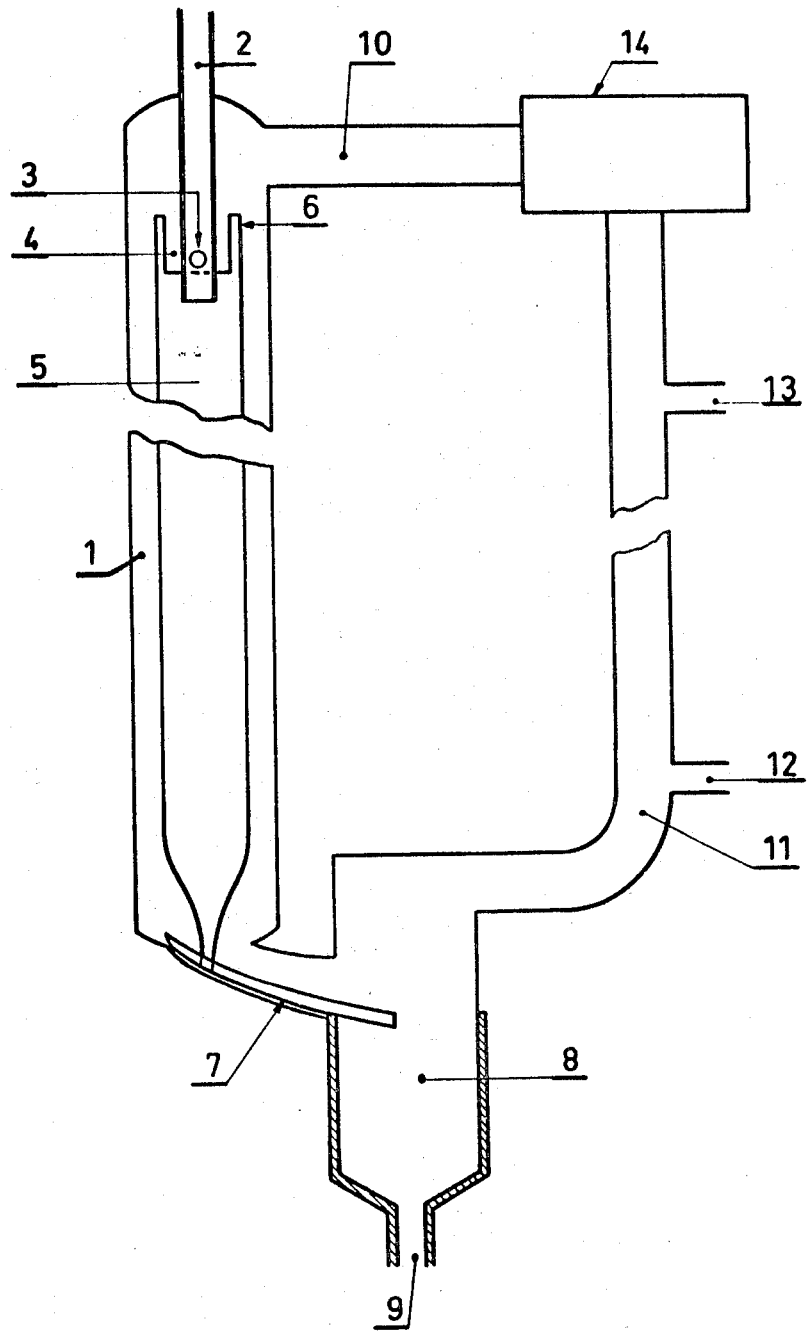

3,625,657
APPARATUS FOR CARRYING OUT POLYMERIZATION AND DIMERIZATION REACTION BY MEANS OF AN AMALGAM
Pierre Mathis, Dombasle-sur-Meurthe, France, and Leon van Melkebeke, Wezembeek-Oppem, Belgium, assignors to Solvay & Cie, Brussels, Belgium
Filed May 29, 1969, Ser. No. 828,946
Claims priority, application Belgium, May 30, 1968, 59,055
Int. Cl. B01j 4/00; C07c 121/20, 121/28
U.S. Cl. 23—285      5 Claims

ABSTRACT OF THE DISCLOSURE

Polymerization and dimerization by means of an amalgam are carried out by circulating a compound to be polymerized or dimerized in a liquid phase in a reactor, circulating the amalgam in the reactor as a continuous film flowing under gravity along a smooth surface and continuously withdrawing a portion of the liquid phase from circulation in a quantity corresponding to the production in the reactor while continuously introducing into circulation, reactants and other components of the liquid phase in amounts which correspond to the quantity withdrawn. The apparatus for carrying out the process includes a closed circuit which contains the reactor. Inside the reactor a substantially smooth vertical or highly inclined surface is provided which supports the flow of a film of amalgam. Means is also provided in the closed circuit for forming the amalgam into a continuous film, flowing down the smooth surface, means for continuously taking a sample of the liquid phase and means for continuously introducing the components of the liquid phase.

BACKGROUND OF THE INVENTION

The present invention is directed to a process and an apparatus for carrying out dimerization and polymerization reactions by means of an amalgam.

The reactions in which an amalgam is used as a reactant involve the presence of at least two phases: the amalgam phase and an organic liquid phase, the latter comprising a solution of the compound to be dimerized or polymerized. Often, there is also present a solid phase which is produced by one of the reaction products. Since diffusion in the amalgam phase is very slow, it is very difficult, in practice, to carry out this type of reaction. A number of apparatuses have been proposed, but none as yet have proven completely satisfactory.

In one of these apparatuses, the amalgam and the other liquid phase run down in parallel streams in flat-bottom channels. These channels may be intersected with baffles which provide for better mixing of the phases present (reference is made to German Pat. No. 728,409 dated Dec. 27, 1938, issued to I. G. Farben). This type of apparatus has the disadvantage of requiring the use of substantial quantities of mercury and the construction of very large buildings. Furthermore, such an apparatus cannot be used if the reactions produce a solid substance which may pollute the amalgam at the surface thereof.

It has also been proposed to use vats provided with a stirrer which operate continuously. In this type of apparatus, the diffusion in each of the phases is obviously improved but, because of the stirring action, substantial quantities of amalgam are dispersed within the other phase and are carried along with the latter (reference is made to Eger G., Handbuck der technischen Electrochemie, vol. 1, first part, page 629 seq, Leipzig, 1961).

In another type of apparatus, droplets of the liquid phase which contain the compound to be reduced are introduced at the lower part of a thick layer of amalgam. Again in this case, there are substantial losses of mercury because droplets of amalgam are carried by the other liquid phase (reference is made to German Pat. No. 941,-481 issued on June 4, 1953 to Wurbs A.).

In Swiss Pat. No. 278,577 dated May 14, 1957 issued to V. de Nora, it has been proposed to use an apparatus for the treatment of amalgams. This apparatus comprises packed vertical colums. According to German Pat. No. 1,062,679 dated Oct. 11, 1954 and issued to Scheurich G., vertical tray columns comprising wire knittings through which the amalgam is dispersed by means of rotating brushes may also be used. This type of apparatus is also responsible for losses of amalgam, the latter being carried away, and requires that the nonpolluted amalgam be recuperated at the foot of the column. Furthermore, clogging problems prevent its use when dealing with reactions resulting in the formation of a solid product.

According to German Pat. No. 967,823, dated July 22, 1954 and issued to Wurbs A., it is possible to use a device which rotates about a horizontal axis, in which the lower portion lies in the amalgam and wherein the upper portion is moistened by the liquid phase. This apparatus serves to increase the exchange surface between the amalgam and the liquid phase without destroying the homogeneity of the amalgam phase. This is made possible because a continuous film of amalgam, which adheres to the rotating device and is continuously being replenished, is formed during the rotation. Such a device however cannot be used when a solid product is formed. Furthermore, movable reactors are delicate and the operating costs are high.

It can then be seen that the traditional apparatuses briefly described above have many disadvantages which up to now have not been satisfactorily overcome. Particularly, none of these apparatuses can be used to carry out reactions in which there is produced a solid substance which can be deposited under gravity in the amalgam phase or which can clog the packing or trays of a vertical column, the latter being used for liquid-liquid exchange.

SUMMARY OF THE INVENTION

A process has now been found by which it is possible to carry out, in a continuous manner, dimerization and polymerization reactions by the use of a device in which the contacting surface between the amalgam and the liquid phase is very large and is continuously being replenished without destroying the homogeneity of the amalgam phase, This process also prevents the amalgam from being contaminated by solid products. Furthermore the liquid phase does not carry droplets of amalgam.

According to the present invention dimerization and polymerization reactions in which a compound to be dimerized or polymerized is reacted in the liquid phase with an amalgam are carried out by circulating the liquid phase containing the compound in turbulent flow in a reaction zone, circulating amalgam in the reaction zone as a continuous film which flows under gravity along a substantially smooth surface which is vertical or highly inclined, and continuously withdrawing from circulation a portion of the liquid phase in a quantity corresponding to the production in the reaction zone while continuously introducing into circulation reactants and other components of the liquid phase in amounts corresponding to said quantity.

It has been found that the above process may be carried out in an apparatus which includes means defining a closed circuit in which a liquid phase containing said compound is circulated, said means defining said closed circuit comprising a reactor, a substantially smooth upright surface internally of said reactor spaced inwardly of inner walls of said reactor to support a flow of said amalgam thereon as a film, means for forming the amalgam into a continuous film which flows under gravity along said smooth surface in said reactor, means for continuously taking a sample of said liquid phase in said means defining said closed circuit, and means for continuously introducing in said means defining a closed circuit reactants and other components of the liquid phase in amounts corresponding to said sample.

BRIEF DESCRIPTION OF THE DRAWING

The figure is a schematic illustration of an apparatus adapted to carry out the process of the invention.

DESCRIPTION OF THE PREFERRED EMBODIMENTS

The process according to the invention is particularly applicable to the dimerization and polymerization reactions involving an amalgam wherein one or more solid reaction products is produced.

This is the case of a large number of hydrogenating dimerization reactions of ethylenically unsaturated compounds. These reactions, carried out in the presence of water, produce hydroxides and, consequently, are responsible for a spontaneous rise in the pH of the reaction mixture. When it is desired to operate under the most favorable conditions, the reaction is carried out in a medium in which the pH is maintained within substantially close limits. This requires the neutralization of the hydroxide. For this purpose hydrogen chloride or carbon dioxide are often used. The products resulting from the neutralization step (chloride, bicarbonate or carbonate) produce a separate solid phase which plugs the usual apparatuses. By carrying out the process according to the present invention, the solid products are kept in divided form, suspended in the liquid phase which circulates in the closed circuit.

An important application of this type of reaction is the hydrogenating dimerization of acrylonitrile to form adiponitrile, as has been disclosed in Dutch Pat. No. 6,609,103 dated June 30, 1966 and granted to Imperial Chemical Industries. This process comprises treating with an alkaline amalgam, an $\alpha$, $\beta$-olefinically unsaturated nitrile or ester in homogeneous organic solution in a polar organic amide. Adiponitrile is an important intermediate used in the synthesis of nylon 66.

Another process which can be used for the production of adiponitrile is described in Belgian Pat. No. 699,530 dated June 6, 1967 and issued to Solvay et Cie. This process comprises treating with an alkaline or alkaline earth amalgam, a $\alpha$-halogenated propionitrile in solution in a solvent which is inert to the amalgam and possesses a high dielectric constant. During the reaction, a halide which is practically insoluble in the reaction mixture is formed as a by-product. When the dimerization reaction of $\beta$-chloro propionitrile is carried out with a sodium amalgam according to the process of the invention, a suspension of sodium chloride crystals is obtained, which, however, is removed during the sampling or removal of portions of the liquid phase.

Sodium amalgam may also be used to carry out polymerization reactions such as for example the synthesis of polypara-xylylidene. This reaction is carried out by treating with a sodium amalgam a solution of dicloro-para-xylene and an aliphatic alcohol in an inert solvent, such as dimethyl sulfoxide. Poly-para-xylylidene is collected in the form of insoluble crystals which are suspended in the organic phase, and circulate with this phase in the closed circuit. They are removed by sampling the fraction corresponding to the produciton of the reactor. Poly-para-xylylidene is a polymer which possesses excellent electrical properties and is resistant to very high temperatures.

By using the process according to the invention, the above reactions may be carried out continuously without causing any particular problem. Even after long periods of operation no deposit of solid material nor any contamination of the amalgam can be observed.

According to the process of the invention, the liquid phase which comprises the compound to be dimerized or polymerized is circulated at high speed in a closed circuit of which the dimerization or polymerization reactor is an element. Consequently, it can be assumed that the composition of the liquid phase is nearly constant. A quantity corresponding to the production of the reactor is sampled from the liquid phase and a corresponding quantity of reactants which compensate for the consumption is added thereto.

The closed circuit through which the liquid phase circulates may comprise, besides the reactor and the channels, a pump, for example, of the helicoidal centrifugal type, which serves to circulate the fluids and devices having other functions such as decanters, filters, heat exchangers, etc.

In the reactor, the liquid phase may be discharged in a direction parallel, in counter flow or transversely to the discharge of the amalgam film depending on the selected shape and the characteristics of the liquid phase. In order to favorably influence the diffusion in this latter phase, the discharge is preferably carried out under the most turbulent conditions. Especially, when one of the reaction products is solid, it is recommended that the liquid phase be circulated at very high speed in order to prevent the formation of crusts and deposits under gravity, of solid materials inside the reactor.

The amalgams have a tendency not to form a homogeneous liquid phase; on the contrary, especially when they are subjected to turbulent flow they have a tendency to divide in droplets which do not easily coalesce. In the apparatuses according to the invention, the amalgam is used in the form of a thin film which moves at high speed when in contact with the other turbulently flowing liquid phase. To prevent a break in the film, the supporting surface along which the latter slides is preferably made of a material which is substantially insoluble in mercury and is easily moistened or wetted by the amalgam. A material which is especially suitable for this purpose is soft iron. The lower its carbon content, the higher its ability of being wetted by an amalgam.

In order that the amalgam adhere as much as possible to the supporting surface, it is recommended that all the impurities which may have been formed or deposited on the supporting surface be removed before starting the reactor. For this purpose, the amalgam film, in operation, may be substantially stabilized by scaling the superficial oxide layers and cleaning the supporting surface. In order to start the apparatus as easily as possible, the supporting surface may also be allowed to soak for a period of many days in a bath of the amalgam; this facilitates the formation of the film. Obviously, it is preferable not to expose the supporting surface to air for an extended period of time.

To make sure that the amalgam film is continuous, the supporting surface should be free of any defect (roughness, cracks, etc.) which could disturb the normal sliding of the film. The surface should preferably be polished, for example electrochemically or by means of abrasive substances. However, it is not essential that the supporting surface be without relief. For example, it may be longitudinally or transversely undulated to increase the exchange surface between the amalgam and the liquid phase without increasing the cumbersomeness or the height of the apparatus. Generally, the shape of the relief of the supporting surface should not affect the continuity of the amalgam film. For this purpose, the variations in the relief should not be too sharp.

The supporting surface may be of any general shape depending on the arrangement inside the reactor. For example, plane supporting surfaces wet by the amalgam on one or both faces thereof, may be arranged in series. When only one of the surfaces is used to support the amalgam, it is not essential that it should be strictly vertical; it may be inclined provided the speed of the amalgam film is decreased. A plurality of supporting surfaces, generally cylindrical, may also be placed in alternate rows inside the reactor. In this case, the reactor itself may be shaped as a vertical cylinder which should contribute to a suitable distribution of the liquid phase. It is also obvious that the supporting surface may have any shape other than plane or cylindrical, though it is not as easily produced.

The amalgam is introduced at the upper portion of the reactor in such a manner that the distribution is as homogeneous as possible along the periphery of the supporting surface. A mode of operation by which this can easily be attained consists in feeding the amalgam to the reactor by means of an overflowing device in which the amalgam flows over the upper edge of the supporting surface. This edge which forms a pouring device should be perfectly horizontal. It is also desirable that the discharge of amalgam be substantially constant in order to obtain a regular operation and to prevent any accidental break of the amalgam film. For this purpose, the reactor should advantageously be fed with an amalgam from a container maintained at a constant level.

If special care is taken, the impoverished or depleted amalgam is easily recuperated at the bottom of the reactor. As previously stated, the amalgam has a tendency to be subdivided or to include solid particles or droplets of liquid phase. For these reasons, the amalgam is preferably removed at the bottom of the reactor. In order to keep the risk of polluting the amalgam to a minimum, the continuous film should penetrate into the amalgam which is being decanted, at an angle which causes no turbulence. In this respect, a device in which the supporting surface just dips into the decanted amalgam has the disadvantage that the film penetrates at a high speed into the amalgam and carries along with it a film of a liquid phase. The lower end of the supporting surface should preferably be curved in such a manner that the amalgam film penetrates into the decanted amalgam tangentially to the surface thereof. When the supporting surface is cylindrical, the lower extremity thereof may be tapered in order to collect the amalgam as a single thread-like stream or flow which is brought into the decanter by means of a spout. The decanter may be used for a plurality of supporting surfaces. The spout is preferably directly in contact with the tapered end of the supporting surface and is preferably made of a material which is insoluble in mercury and may easily be wet by amalgam.

The continuous film of amalgam may be of any height. It must be determined in each particular case as a function of the alkali or alkali-earth metal content of the amalgam feed and as a function of the concentration required at the outlet of the reactor. The flow of the amalgam may also vary indifferently. For each apparatus, however, there is a minimum flow which must be maintained in order to prevent any risk of division of the film. This minimum flow is dependent among other factors on the height of the film, the concentration of the amalgam, the nature and the state of the supporting surface, etc. When one of the reaction products is solid, particles may become incrusted on the supporting surface which can then serve as seeds for further deposits. There is no such disadvantage when the flow of amalgam is maintained at a sufficiently high value.

In view of the difference of potential between the amalgam and the liquid phase, it is desirable that the supporting surface, when made of a material which is electrically conductive, be isolated from the other parts of the apparatus, in order to prevent electrical losses which unnecessarily consume amalgam.

The reactions which may be carried out in the apparatus according to the invention sometimes require the application of removal of heat. The supporting surfaces may be provided with any kind of heat exchanger device which does not affect the properties of the surface such as electrical resistances or coils sunk in the mass.

Referring to the figure, the apparatus which has been schematically illustrated may be used to carry out reactions as described above which produce a solid compound; the amalgam penetrates inside the cylindrical reactor 1 by means of duct 2 which is connected to a constant level tank not illustrated in the drawing. Through the circular opening 3, the amalgam flows into the cup 4 formed in the upper portion of the cylinder 5 in which the vertical wall is used as supporting surface for the amalgam film. This cylinder is made of a low carbon steel. It has been straightened by machining, then polished by means of an abrasive paste, dipped for 12 hours in caustic soda lye having a concentration of 200 g./l. and amalgamated by soaking for 5 days before use. The film is formed by overflowing the amalgam over the edge 6 of the cup 4. When mounting the apparatus, it is recommended that the edge 6 be perfectly horizontal and the cylinder 5 be perfectly vertical.

The lower portion of the cylinder 5 has been tapered in order to collect the cylindrical film of amalgam as a single thread-like flow. This lower portion is in contact with the spout 7 also made of low carbon steel which brings the depleted amalgam in the decanter 8 tangentially to the surface of the decanted amalgam.

It will be seen that the path of the amalgam in the reactor has no break. The decanted amalgam is evacuated by means of a channel 9. It is recommended that the level of the amalgam in the decanter remain constant.

In the apparatus represented in the figure the liquid phase which contains the compound to be reduced circulates at high speed in a closed circuit. It penetrates into the reactor through channel 10. The outlet is at the lower portion through decanter 8. The liquid phase then passes through channel 11 in which a sample corresponding to the production of the reactor is taken through the channel 12 and a corresponding quantity of reactants is added through the channel 13. The liquid phase then passes through the helicoidal centrifugal pump 14 before being reinjected into the reactor. The liquid phase circulates at high speed inside the reactor in a direction parallel to the direction of the amalgam. In this manner, strong agitation is maintained in the neighborhood of the reaction surface and the solid reaction products are eventually maintained in suspension.

Special building care should be taken in order that cylinder 5, spout 7 and decanter 8, which are formed of materials which are insoluble in mercury and are easily wet by the amalgam, be electrically insulated from the other parts of the apparatus if they are electrically conductive. On the other hand, the channels and the shapes of the various parts of the apparatus are constructed in such a manner that there is no passage zone of the liquid phase which is not flushed by a sufficiently strong stream to prevent formation of solid deposits.

In order to illustrate the performances of the apparatus according to the invention, the following examples are given. which involve reactions of the reduction of organic compounds with a sodium amalgam, in an apparatus according to the present invention.

It is obvious that the invention is not limited to the examples described herein and can be applied to any dimerization and polymerization reaction which uses an alkaline or alkaline-earth amalgam and a phase not miscible therewith which contains the derivative to be dimerized or polymerized.

Example 1

The apparatus is similar to the one illustrated in the figure. The reactor is made of glass and has an inner diameter of 22 mm. It is provided with a heating jacket which serves to control the temperature of the liquid phase. The cylinder which is used to support the continuous film of amalgam is made of concrete soft iron and has a diameter of 15 mm. The height of the cylinder is 340 mm. and the surface of the amalgam film is 165 cm.².

The above apparatus is used to carry out the dechlorinating dimerization of β-chloropropionitrile to form adiponitrile in accordance with Belgian Pat. No. 699,530 dated June 6, 1967 and granted to Solvay et Cie. This reaction involves the production of sodium chloride which is insoluble in the reaction mixture. In view of the high circulation speed of the liquid phase comprising β-chloropropionitrile, in the circuit comprising the reactor, it is agreed that the composition of this latter phase is constant at any time and at any place. It comprises 400 g./kg. of liquid phase of dimethyl sulfoxide, 59 g./kg. of β-chloropropionitrile, 50 g./kg. of water, 24 g./kg. of acrylonitrile and the organic reaction products. The flow of liquid phase in the circuit comprising the reactor, is 170 liter per hour which corresponds to an average speed inside the reactor, of about 23 cm./sec. The liquid phase circulates downwardly and the temperature is maintained at 40° C. in the reactor.

The reactor is supplied with an amalgam containing 2.49 g./kg. of sodium. The flow of amalgam is 60 kg. per hour. At the outlet of the reactor, the amalgam contains 1.73 g./kg. of sodium.

There are produced 102 g. per hour of adiponitrile and 116 g. per hour of sodium chloride which is substantially insoluble in the reaction mixture. The adiponitrile formed is separated by sampling a fraction of the liquid phase, said fraction being compensated by a suitable addition of solvent, β-chloropropionitrile and acrylonitrile. In spite of the high amount of solid product formed, the operation of the apparatus is constant without producing any plugging or crusting. The depleted amalgam is collected and is not polluted with sodium chloride or occlusions of the liquid phase. Similarly, the liquid phase contains no mercury which improves the true yields and facilitates the purification.

Example 2

The dimerization of acrylonitrile to form adiponitrile is carried out in the same apparatus as in Example 1. Acrylonitrile is used in solution in dimethyl sulfoxide. The reaction is carried out in the presence of a sodium amalgam.

The liquid phase which circulates in the closed circuit comprises 650 g./kg. of dimethyl sulfoxide, 150 g./kg. of water, 69 g./kg. of acrylonitrile and the reaction products. The flow is 170 liter per hour which corresponds to an average speed of about 23 cm./sec. Inside the reactor, the temperature is maintained at 29.5° C.

The reactor is supplied with an amalgam containing 5.71 g./kg. of sodium. The flow of amalgam is 10.244 kg. per hour. At the outlet of the reactor, the amalgam contains 0.94 g./kg. of sodium.

The apparent pH measured with an industrial pH meter in the organic phase, is kept at 9.15 by adding glacial acetic acid. There are produced 114.6 g. of adiponitrile per hour and also sodium acetate which remains suspended in the solution of acrylonitrile. A sampling is taken of the liquid phase corresponding to the production of adiponitrile in the reactor. This sampling is compensated by adding solvent, acrylonitrile and water in order to maintain a constant concentration of these components in the liquid phase. The recuperation of the amalgam and of the liquid phase, both of which are not polluted, presents no particular problem. In operation, the apparatus runs with regularity and with an increased productivity.

Example 3

The apparatus is the same as the one illustrated in the annexed figure and described in Example 1.

At the outlet of the centrifugal pump 14, the liquid phase is supplied at the top of a Vigreux column having a height of 40 cm. and a diameter of 4.5 cm., and the liquid phase is allowed to flow by gravity towards the reactor. The Vigreux column is used to introduce carbon dioxide in the liquid phase in order to neutralize the base formed during the reaction.

This apparatus is used to carry out the hydrogenating dimerization of acrylonitrile to form adiponitrile. Acrylonitrile is used in solution in dimethylsulfoxide. The reaction is carried out in the presence of a potassium amalgam.

The liquid phase which circulates in closed circuit comprises 650 g./kg. of dimethylsulfoxide, 146 g./kg. of water, 94.7 g./kg. of acrylonitrile and the reaction products. The flow is 174 liter per hour which corresponds to an average speed of about 23.7 cm./sec. The temperature is maintained at 20° C. in the reactor.

The reactor is supplied with an amalgam containing 4.62 g./kg. of potassium. The flow of amalgam is 94.15 kg./h. At the outlet of the reactor, the amalgam contains 3.57 g./kg. of potassium.

The apparent pH measured with an industrial pH meter is maintained at 9.5 by adding carbon dioxide to the Vigreux column. There are produced 128 g. per hour of adiponitrile, and also potassium carbonate and bicarbonate which remain suspended in the acrylonitrile solution. A sampling is taken of the liquid phase corresponding to the production of adiponitrile in the reactor. This sampling is compensated by adding dimethyl sulfoxide, acrylonitrile and water in order to maintain a constant concentration of the components of the liquid phase.

In operation, the apparatus runs regularly and there is no pollution of the solution by the amalgam, or of the amalgam by the solid reaction product.

What we claim and desire to secure by Letters Patent is:

1. Apparatus for carrying out dimerization or polymerization reactions in which a compound in a liquid phase is dimerized or polymerized by reaction with an amalgam comprising, means defining a closed circuit in which a liquid phase containing said compound is circulated at high speed in turbulent flow so as to keep the composition of said liquid phase nearly constant and to prevent crusting by any solids formed, said means defining said closed circuit comprising a reactor, a substantially smooth upright surface internally of said reactor spaced inwardly of inner walls of said reactor to support a flow of said amalgam thereon as a film and tapered at a lower portion thereof so as to gather the film of amalgam into a single thread-like flow, means for forming the amalgam into a continuous film which flows under gravity along said smooth surface in said reactor, means for separating the gathered amalgam from the liquid phase comprised of a decanter into which said gathered amalgam and said liquid flow upon leaving the reaction zone and means for directing the film of gathered amalgam flowing from said reaction zone so that it penetrates the surface of the decanted amalgam tangentially, means for continuously taking a sample of said liquid phase in said means defining said closed circuit, and means for continuously introducing in said means defining a closed circuit reactants and other components of the liquid phase in amounts corresponding to said sample.

2. Apparatus according to claim 1, in which said means defining a closed circuit includes a helicoidal centrifugal pump.

3. Apparatus according to claim 1 in which the surface supporting said film in said reactor comprises a material which is insoluble in mercury and easily wetted by amalgam.

4. Apparatus according to claim 3 wherein said surface supporting said film comprises soft iron.

5. Apparatus according to claim 1 in which said reactor comprises a device for feeding the amalgam and in which said means for forming the amalgam into a continuous film comprises a cup-shaped device in which said amalgam is received and allowed to overflow above an upper edge of said smooth surface which supports the amalgam flow.

References Cited
UNITED STATES PATENTS

| | | |
|---|---|---|
| 2,133,735 | 10/1938 | Waterman et al. |
| 2,684,287 | 7/1954 | Seavey _____ 23—252 X |
| 3,297,412 | 1/1967 | Phillips, Jr., et al. ____ 23—285 |
| 3,386,981 | 6/1968 | Akaboshi et al. ____ 23—285 X |

JOSEPH SCOVRONEK, Primary Examiner

U.S. Cl. X.R.

23—61, 252, 260, 283; 260—2 H, 465.8 A